US010875264B2

(12) United States Patent
Baddock et al.

(10) Patent No.: US 10,875,264 B2
(45) Date of Patent: *Dec. 29, 2020

(54) PLY LOCATION TEMPLATES FOR DOUBLE DIAPHRAGM VACUUM BAGGING SYSTEMS

(71) Applicant: The Boeing Company, Chicago, IL (US)

(72) Inventors: Keith Edward Baddock, Emerald (AU); Peter Lucas Heintz, Mordialloc (AU); Manning James Scarfe, Ascot Vale (AU)

(73) Assignee: The Boeing Company, Chicago, IL (US)

( * ) Notice: Subject to any disclaimer, the term of this patent is extended or adjusted under 35 U.S.C. 154(b) by 227 days.

This patent is subject to a terminal disclaimer.

(21) Appl. No.: 16/017,161

(22) Filed: Jun. 25, 2018

(65) Prior Publication Data

US 2019/0389157 A1 Dec. 26, 2019

(51) Int. Cl.
*B29C 70/54* (2006.01)
*B29C 43/36* (2006.01)
(Continued)

(52) U.S. Cl.
CPC ........ *B29C 70/543* (2013.01); *B29C 43/3642* (2013.01); *B29C 70/342* (2013.01); *B29C 70/443* (2013.01); *B29C 2043/3615* (2013.01); *B29C 2043/3644* (2013.01); *B29C 2043/3665* (2013.01)

(58) Field of Classification Search
CPC ..... B29C 70/342; B29C 70/44; B29C 70/543; B29C 2043/3644; B29C 2043/3647
See application file for complete search history.

(56) References Cited

U.S. PATENT DOCUMENTS 4,961,700 A 10/1990 Dunbar
5,046,707 A * 9/1991 Allen .................. B23Q 1/52
269/309

(Continued)

FOREIGN PATENT DOCUMENTS

EP 0418843 A1 3/1991
EP 2070678 A1 6/2009
EP 2909014 B1 9/2016

OTHER PUBLICATIONS

European Search Report; Application EP19176786; dated Nov. 28, 2019.

(Continued)

*Primary Examiner* — Carson Gross
(74) *Attorney, Agent, or Firm* — Duft & Bornsen, PC

(57) ABSTRACT

Systems and methods are provided for securing laminates to mandrels. One embodiment is a method for facilitating layup of preforms, the method including selecting a mandrel that includes at least one receptacle, disposing a first vacuum bag atop the mandrel that covers the receptacle, selecting a Ply Location Template (PLT) that includes a securement element, aligning a portion of the securement element with the receptacle, pressing the portion of the securement element downward into the first vacuum bag and driving the portion of the securement element into the receptacle, and abutting a preform against the PLT.

20 Claims, 11 Drawing Sheets

(51) Int. Cl.
  *B29C 70/34* (2006.01)
  *B29C 70/44* (2006.01)

(56) References Cited

U.S. PATENT DOCUMENTS

| | | | |
|---|---|---|---|
| 7,624,491 B2 * | 12/2009 | Polus | B29C 37/005 29/464 |
| 2015/0352827 A1 * | 12/2015 | Bye | B29C 70/46 156/297 |
| 2017/0239896 A1 | 8/2017 | Stawski | |

OTHER PUBLICATIONS

Journal of Science: Advanced Materials and Devices; https://www.sciencedirect.com/science/article; Jun. 5, 2018.

* cited by examiner

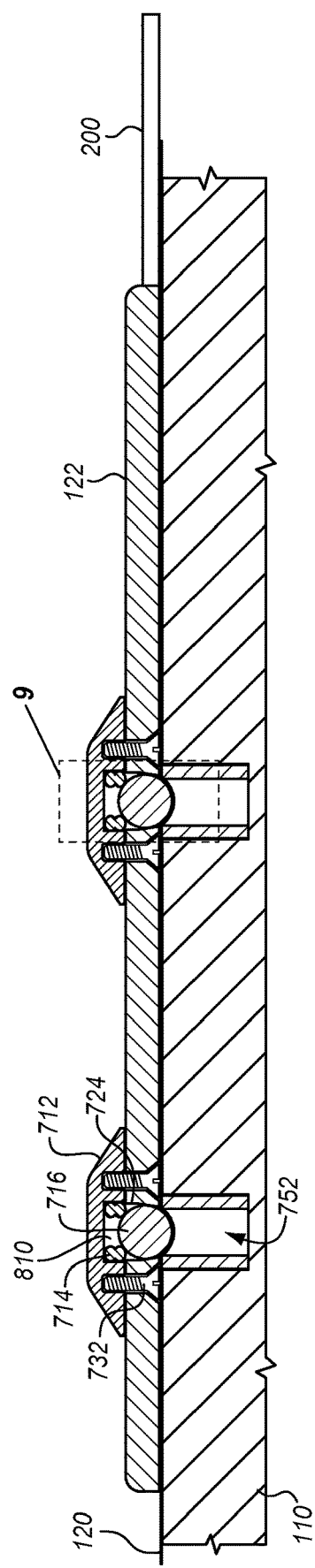
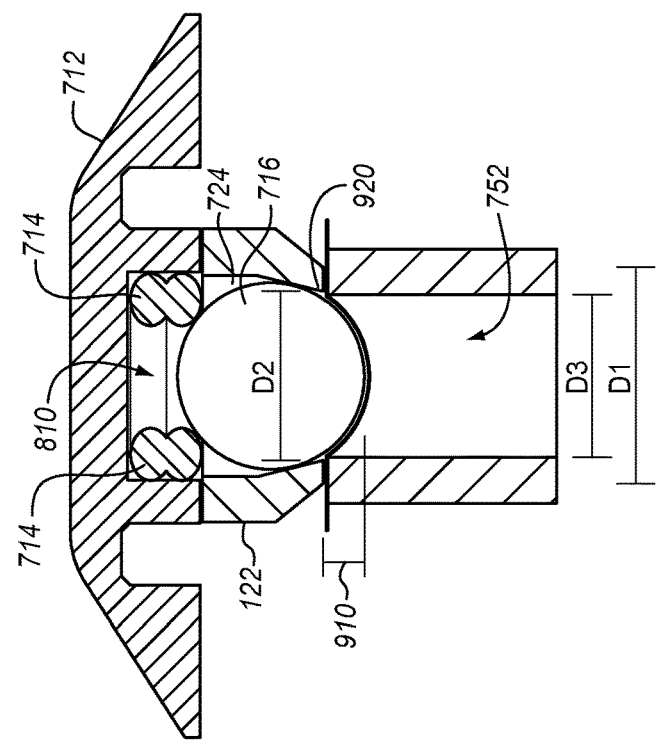

PLY LOCATION TEMPLATES FOR DOUBLE DIAPHRAGM VACUUM BAGGING SYSTEMS

FIELD

The disclosure relates to the field of composite fabrication, and in particular, to fabrication of composite parts via a vacuum bag.

BACKGROUND

When fabricating a preform into a composite part (e.g., a Carbon Fiber Reinforced Polymer (CFRP) part, a vacuum bag may be placed atop a preform. Evacuation of the air under the vacuum bag allows atmospheric pressure to push the preform down onto a mandrel. Thus, the vacuum bag may press the preform onto a mandrel in a desired shape. The vacuum bag may apply a variety of forces to the preform during curing, and these forces may even shift the location of the preform on the mandrel. Thus, securement of the preform onto the mandrel remains an important consideration. This concern is amplified in scenarios where double diaphragm vacuum bagging is performed. In double diaphragm vacuum bagging, a first vacuum bag is placed between the mandrel and the preform, and a second vacuum bag is placed atop the preform. The vacuum bags have a lower coefficient of friction than the preform itself. Hence, the entire assembly is more vulnerable to sliding across the mandrel during set up and curing. If the preform slides during setup and/or curing, then a shape of a resulting composite part may be out of tolerance, which is undesirable.

Therefore, it would be desirable to have a method and apparatus that take into account at least some of the issues discussed above, as well as other possible issues.

SUMMARY

Embodiments described herein provide Ply Location Templates (PLTs) which include specialized mounts for use in double diaphragm bagging. The mounts utilize spherical bearings which penetrate into a mandrel and distort (but do not rip) a vacuum bag underlying the preform. When secured via the mounts, the PLTs physically prevent the preform from shifting or distorting during layup and curing.

One embodiment is a method for facilitating layup of preforms, the method including selecting a mandrel that includes at least one receptacle, disposing a first vacuum bag atop the mandrel that covers the receptacle, selecting a Ply Location Template (PLT) that includes a securement element, aligning a portion of the securement element with the receptacle, pressing the portion of the securement element downward into the first vacuum bag and driving the portion of the securement element into the receptacle, and abutting a preform against the PLT.

A further embodiment is a method for securing a vacuum bag to a mandrel, the method including disposing a vacuum bag atop a mandrel, and securing the vacuum bag to the mandrel.

A further embodiment is a method for placing a preform onto a mandrel, the method including identifying a tool that is at the mandrel and for which translation has been prevented, and abutting an edge of a preform against the tool.

Yet another embodiment is a non-transitory computer readable medium embodying programmed instructions which, when executed by a processor, are operable for performing a method for facilitating layup of preforms that includes: selecting a mandrel that includes at least one receptacle, disposing a first vacuum bag atop the mandrel that covers the receptacle, selecting a Ply Location Template (PLT) that includes a securement element, aligning a portion of the securement element with the receptacle, pressing the portion of the securement element downward into the first vacuum bag and driving the portion of the securement element into the receptacle, and abutting a preform against the PLT.

A still further embodiment is an apparatus in a form of a Ply Location Template (PLT), including: a body that conforms with a surface of a mandrel; and at least one mount comprising, a socket, a securement element disposed within the socket having a portion that protrudes beneath the socket, and a biasing component within the socket that applies force which pushes the portion out of the socket.

An even further embodiment is a method for placing a template on a mandrel, the method including selecting a template that includes a body and at least one mount comprising a securement element disposed within the body, and aligning the body at a mandrel to secure the template to the mandrel.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 8 is a section cut side view of PLT mounted to a mandrel in an illustrative embodiment.

FIG. 9 is a zoomed in section cut side view of PLT mounted to a mandrel in an illustrative embodiment.

DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Composite parts, such as Carbon Fiber Reinforced Polymer (CFRP) parts, are initially laid-up in multiple layers that together form a laminate. Individual fibers within each layer of the laminate are aligned parallel with each other, but different layers may exhibit different fiber orientations in order to increase the strength of the resulting composite along different dimensions. The laminate may include a liquid resin that solidifies in order to harden the laminate into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber may be infused with resin prior to curing. For thermoset resins, the hardening is a one-way process referred to as curing, while for thermoplastic resins, the resin may return to liquid form if it is re-heated. The following discussion in the specification describes enhanced systems that facilitate layup and processing of composite parts.

Figure 1:
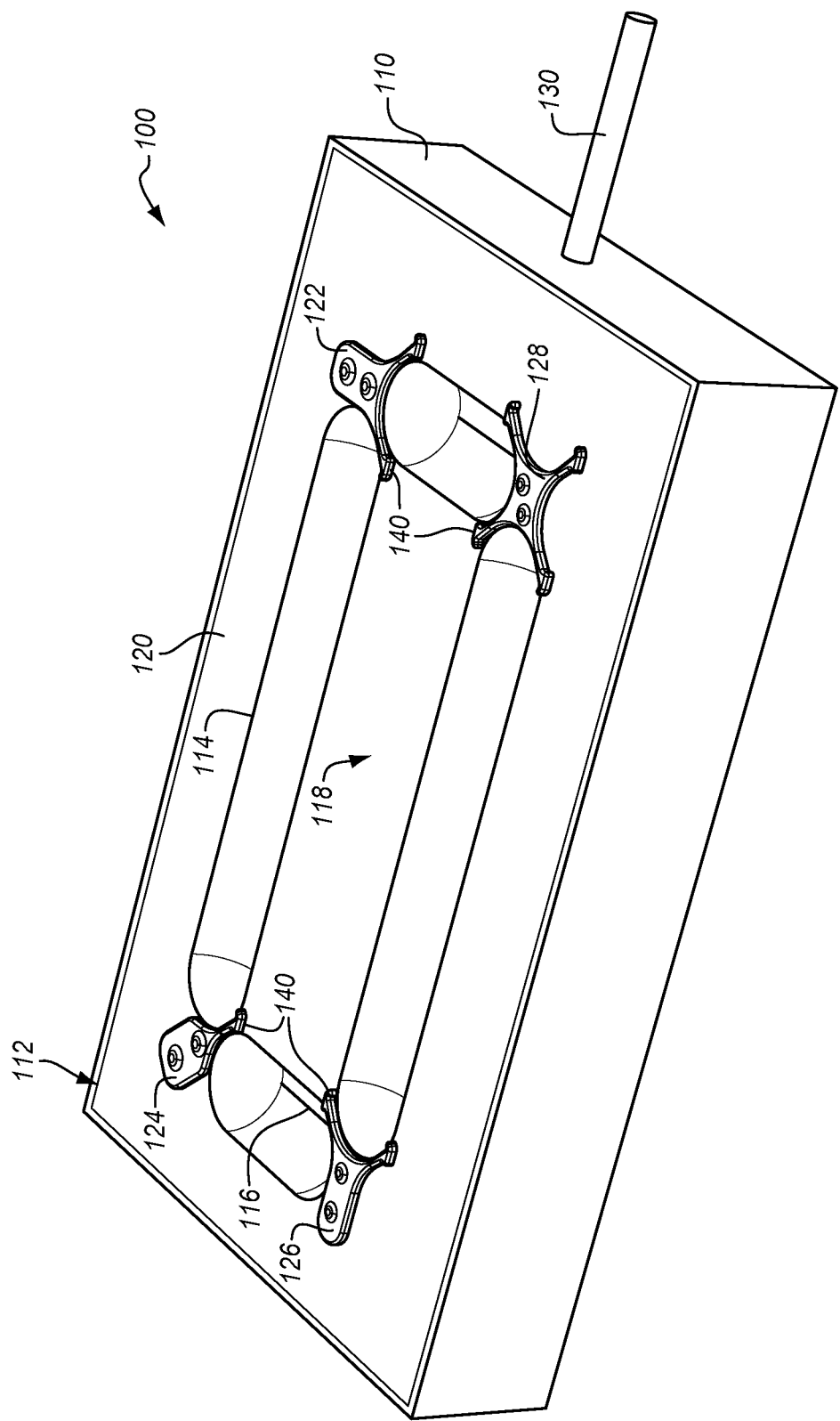
FIG. 1 is a diagram of a composite fabrication system that includes a mandrel, a vacuum bag, and PLTs for fabricating a composite part in an illustrative embodiment.
Figure 2:
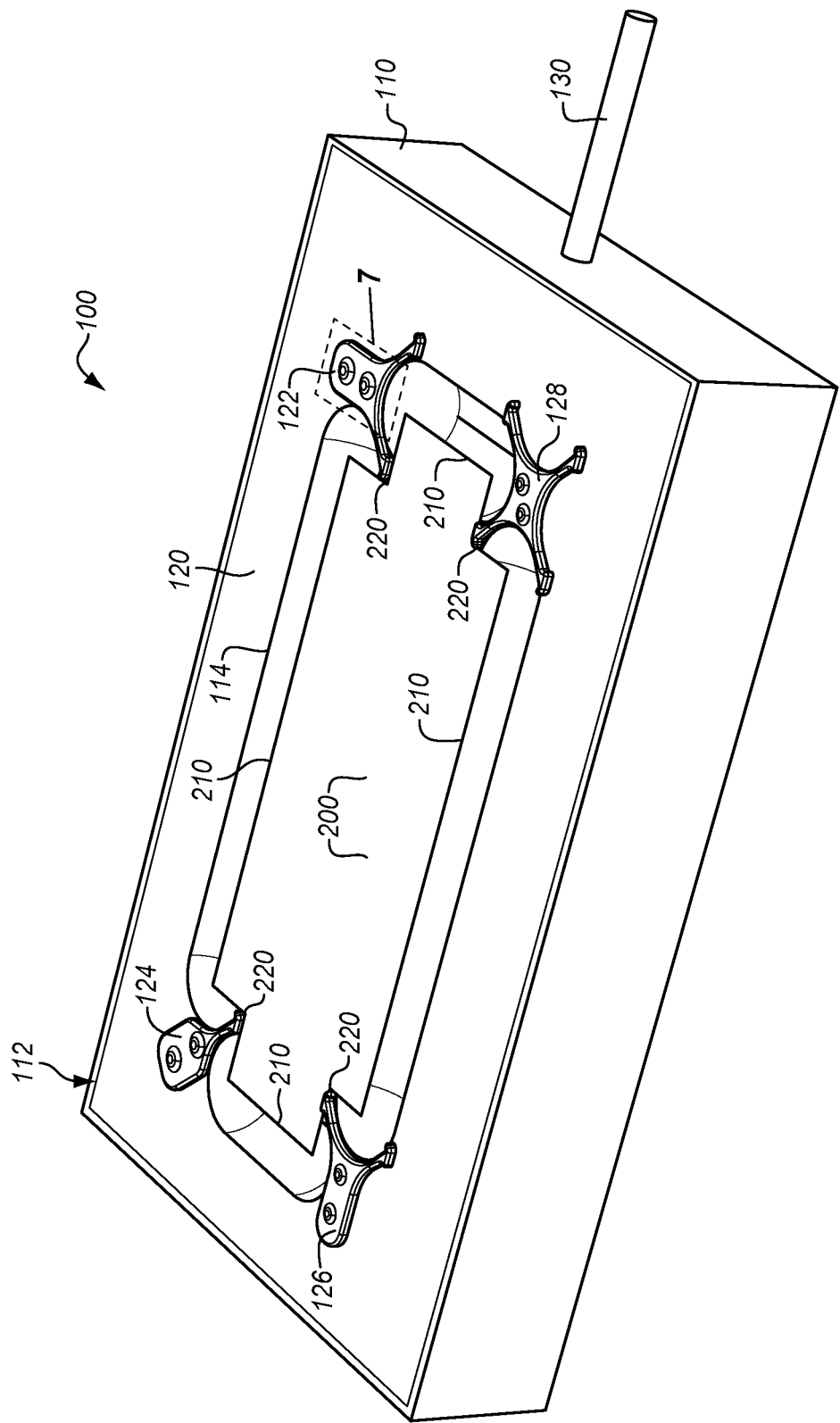
FIG. 2 is a diagram of a preform laid-up atop a mandrel and a vacuum bag, and bounded by PLTs in an illustrative embodiment.
Figure 3:
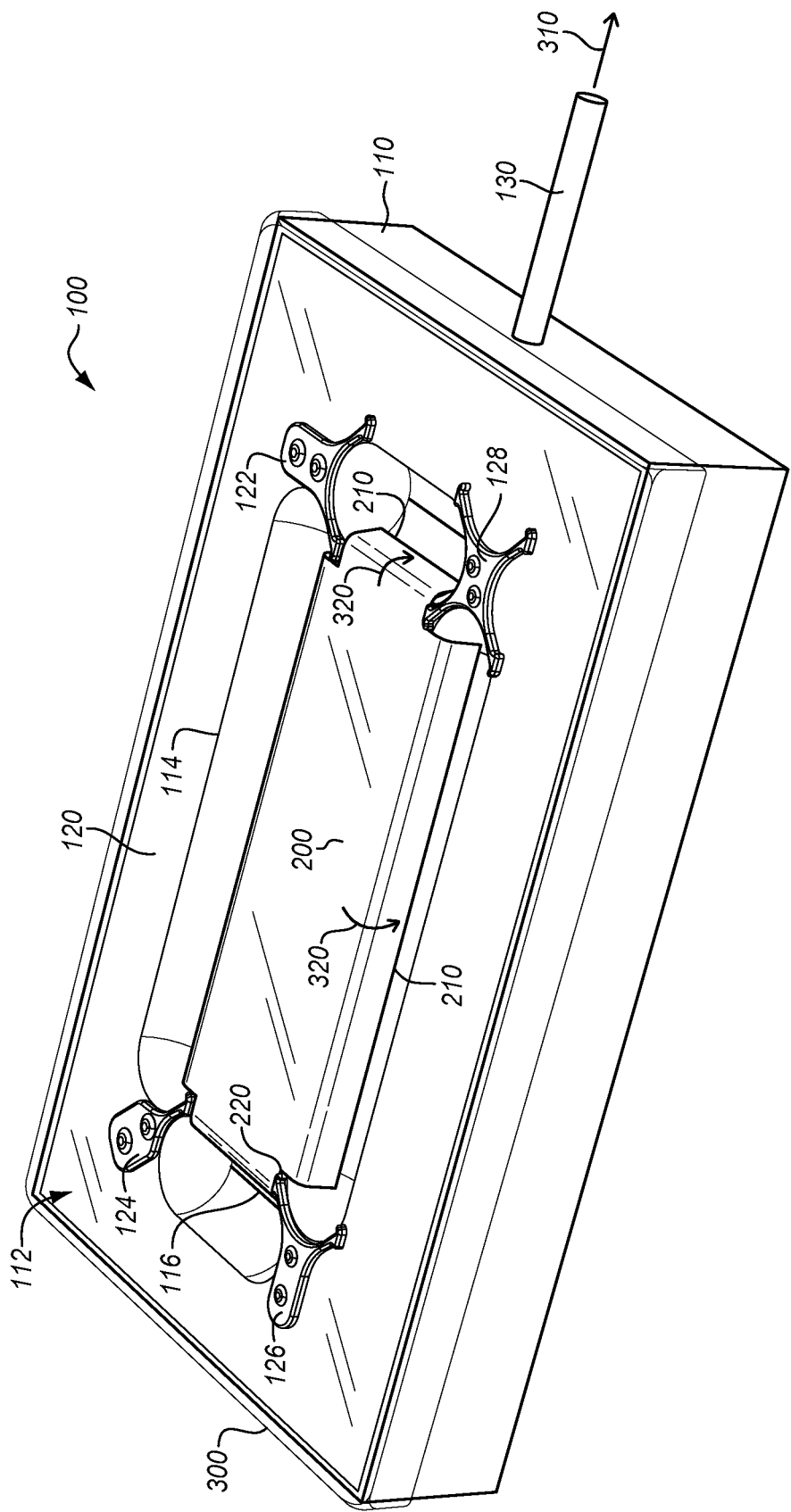
FIG. 3 is a diagram of a preform being cured via double diaphragm vacuum bagging in an illustrative embodiment.

FIGS. 1-3 illustrate setup processes for a system that cures a preform via double diaphragm vacuum bagging techniques. Specifically, FIG. 1 is a diagram of a composite fabrication system 100 that includes a mandrel 110, a first vacuum bag 120, and Ply Location Templates (e.g., PLTs 122-128) for fabricating a composite part in an illustrative embodiment. According to FIG. 1, a surface 112 of mandrel 110 will receive a preform at region 118. First vacuum bag 120, which is transparent, is laid-up atop and sealed to surface 112 (including region 118), and PLTs 122-128 are placed atop first vacuum bag 120 and secured to mandrel 110. PLTs 122-128 include borders 140, which help to define boundaries (e.g., corner radii) for a preform that will be laid-up in region 118.

Mandrel 110 includes hollow portions 114, which are connected via slits 116 with vacuum cable 130. When a vacuum is applied via vacuum cable 130, air is evacuated from hollow portions 114 via slits 116. This action will draw first vacuum bag 120 into hollow portions 114, which shapes a preform atop first vacuum bag 120 into a desired shape.

FIG. 2 illustrates the system of FIG. 1 wherein a preform 200 has been laid-up in region 118. In this embodiment, flanges 210 of preform 200 protrude out over hollow portions 114, but are supported by first vacuum bag 120. These flanges 210 will be drawn into hollow portions 114 when a vacuum is applied. Features 220 (e.g., corners, edges, sides) of preform 200 are supported by PLTs 122-128, and hence will remain in place when vacuum is drawn.

FIG. 3 illustrates the system of FIG. 2, wherein a second vacuum bag 300, which is also transparent, has been laid-up atop preform 200, PLTs 122-128, first vacuum bag 120, and mandrel 110. Second vacuum bag 300 has been sealed to mandrel 110. A first vacuum may then pull air from between first vacuum bag 120, and second vacuum bag 300. Furthermore, as shown in FIG. 3, a second vacuum is drawn to pull air out of hollow portions 114 via vacuum cable 130 in direction 310. This applies suction which physically stretches and deforms the first vacuum bag 120 and second vacuum bag 300, drawing both into hollow portions 114. The deformation of the vacuum bags also bends flanges 210 as indicated by arrows 320, which gives preform 200 a desired shape for curing. During this process, PLTs 122-128 provide structural support that prevents features 220 from distorting, warping, shifting, or tearing.

Figure 4:
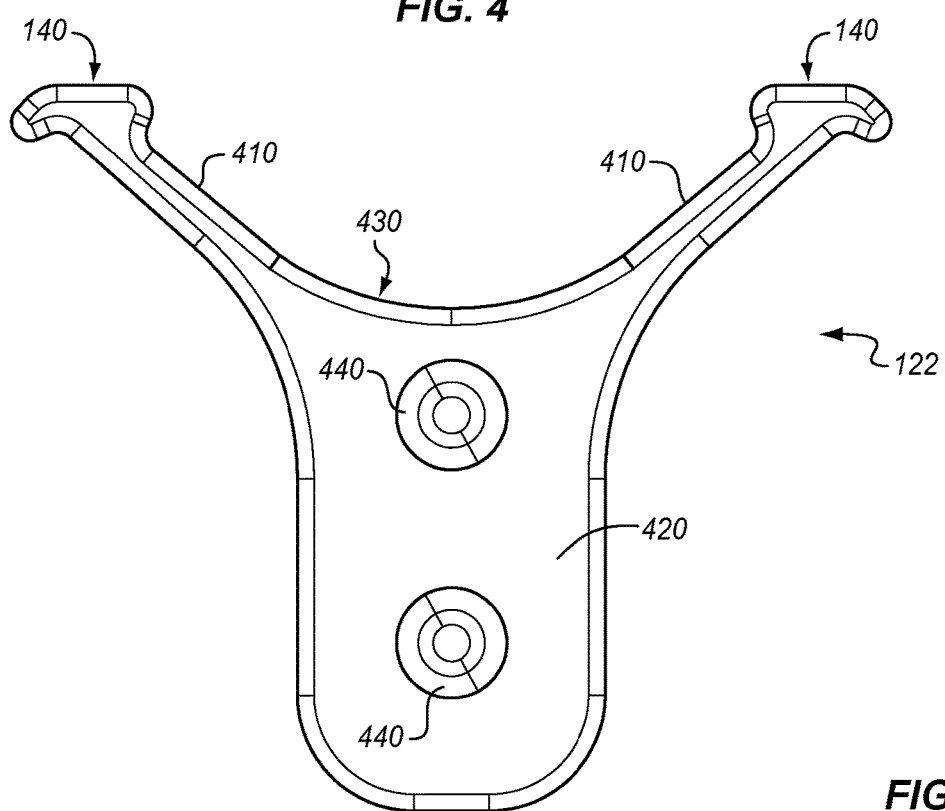
FIGS. 4-6 are views of PLTs in illustrative embodiments.
Figure 5:
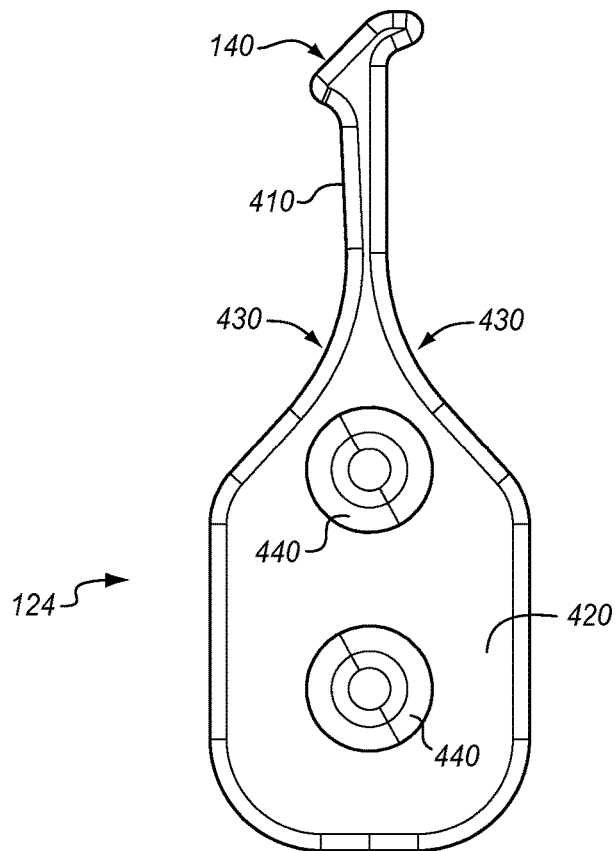
Figure 6:
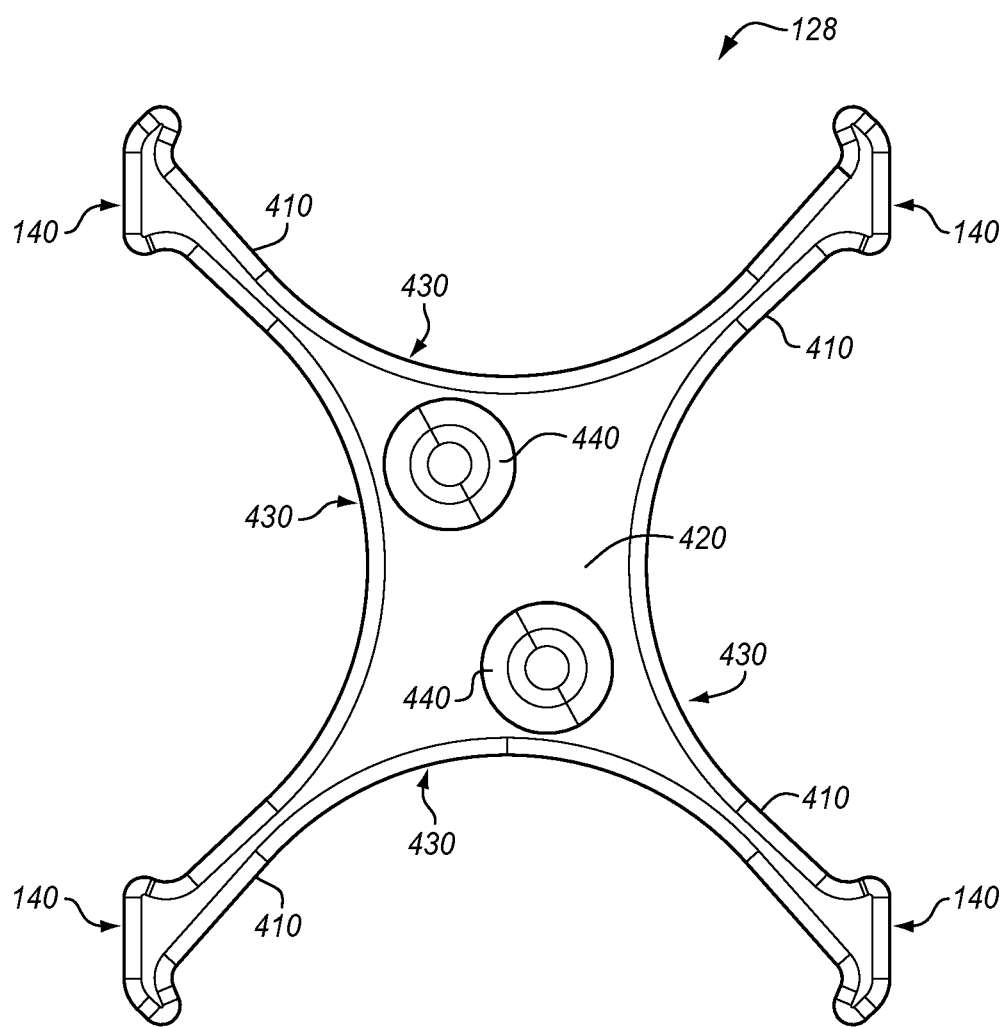

With an explanation provided of the general operations of composite fabrication system 100 during curing, FIGS. 4-6 further illustrate PLTs in illustrative embodiments. Specifically, FIGS. 4-6 are top views of PLT 122, PLT 124, and PLT 128, respectively. PLT 126 shares a similar two-prong design with PLT 122. As shown in FIG. 4, PLT 122 includes body 420, which is substantially flat or otherwise conforms with surface 112 of mandrel 110. One or more prongs 410 protrude from body 420, and prongs 410 may include borders 140 that define a corner, side, or other feature of preform 200. Contour 430 at PLT 122 skirts around a hollow portion 114 at mandrel 110. Furthermore, mounts 440 retain PLT 122 in position at mandrel 110, even when PLT is placed atop the first vacuum bag 120. FIGS. 5-6 illustrate similar features for PLTs 126-128.

Figure 7:
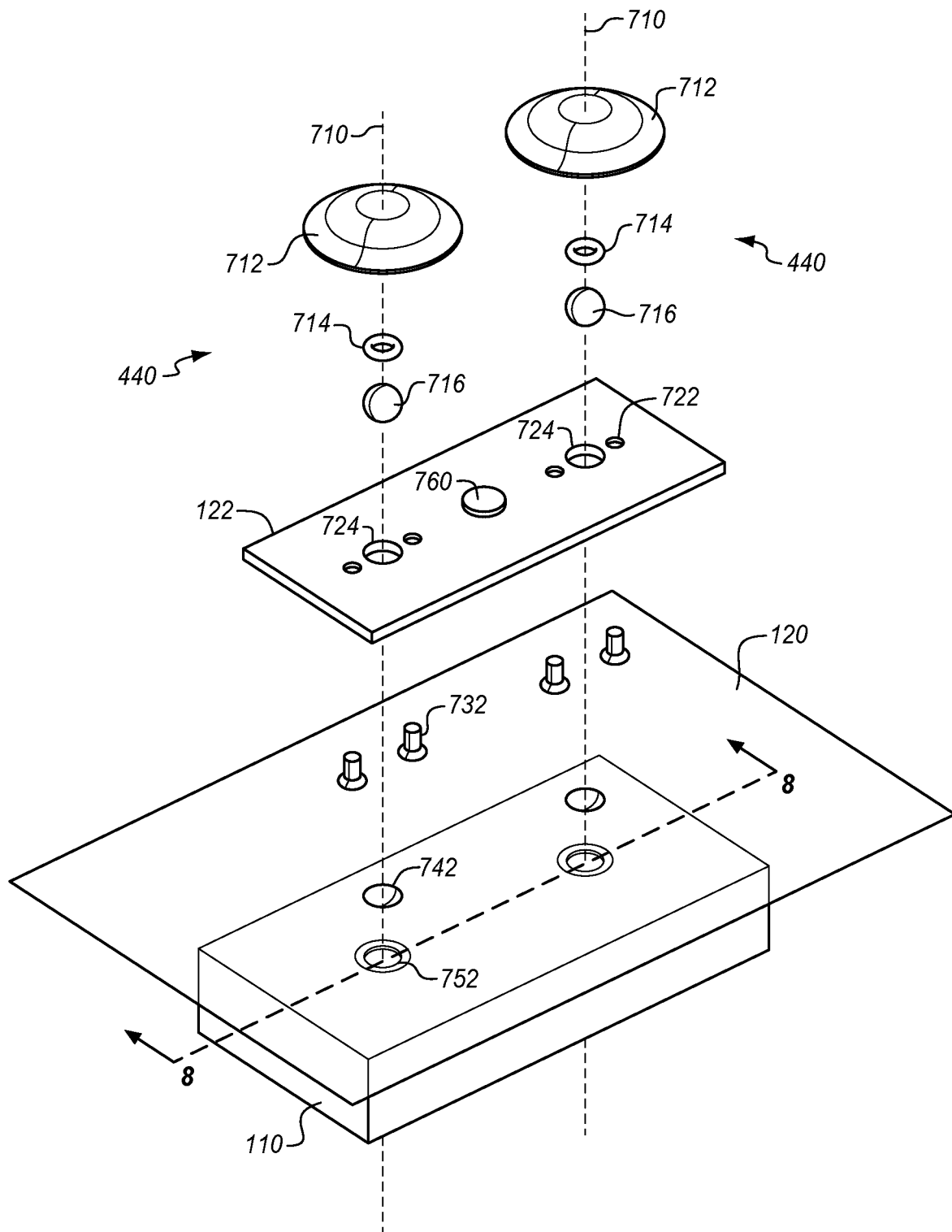
FIG. 7 is an exploded perspective view of a mount at a PLT in an illustrative embodiment.

FIGS. 7-8 illustrate mounting features for the PLTs of FIGS. 4-6. Specifically, FIG. 7 is an exploded perspective view of region 7 of FIG. 2 which illustrates how mounts 440 of FIG. 4 hold PLT 122 in position at mandrel 110. FIG. 7 illustrates that PLT 122 includes multiple sockets 724, which are aligned with receptacles 752 in mandrel 110 as indicated by axes 710. Each mount 440 includes a securement element 716 (e.g., a spherical ball) within socket 724. Securement elements 716 each include a portion that protrudes downward from a socket 724, forming indent 742 in first vacuum bag 120 and protruding into receptacles 752. When a portion of securement element 716 protrudes downwards into a receptacle 752, the portion physically interferes with motion of PLT 122 along surface 112, which locks the PLT 122 in position along surface 112 of mandrel 110. Mounts 440 also include biasing devices 714 (e.g., a rubber gasket, a helical spring, etc.) which applies force that pushes securement element 716 downwards. In one embodiment, securement elements 716 are magnetic, and hence biasing devices 714 comprise magnetic portions of securement elements 716. In such an embodiment, biasing devices 714 may be integral with and/or indistinguishable from securement elements 716. Caps 712 hold biasing devices 714 in place, and caps 712 are mounted via fasteners 732 to holes 722 in PLT 122. Furthermore, in embodiments where mandrel 110 is magnetic (e.g., made of steel, invar, etc.), a magnet 760 (e.g., a rare earth magnet) magnetically drives PLT 122 into mandrel 110 (e.g., because mandrel 110 or a portion thereof is magnetic). This action magnetically drives securement element 716 into receptacle 752. In a further embodiment, securement element 716 is itself magnetic.

FIG. 8 is a section cut side view of PLT 122 mounted to a mandrel 110 in an illustrative embodiment, and corresponds with view arrows 8 of FIG. 7. FIG. 8 illustrates that each securement element 716 protrudes at least partially downward out of a socket 724 and into a receptacle 752. Biasing devices 714 are placed within recesses 810 defined by caps 712, and biasing devices 714 push securement element 716 into place.

FIG. 9 is a zoomed in section cut side view of PLT 122 mounted to a mandrel 110 in an illustrative embodiment. FIG. 9 illustrates further features, such as portion 910 of securement element 716, which protrudes beneath socket 724. FIG. 9 also illustrates prongs 920 of socket 724. Prongs 920 reduce a diameter of socket 724 in order to prevent securement element 716 from falling downwards out of socket 724. Specifically, while a portion of socket 724 and securement element 716 generally have a diameter D1, prongs 920 reduce the diameter of another portion of socket 724 to D2, which is less than D1. This aspect physically prevents securement element 716 from exiting its socket 724. Socket 752 has a diameter D3 which is smaller than D1, and smaller than or equal to D2.

Illustrative details of the operation of composite fabrication system 100 will be discussed with regard to FIG. 10. Assume, for this embodiment, that a technician wishes to perform double-diaphragm vacuum bagging in order to fabricate a composite part at mandrel 110.

Figure 10:
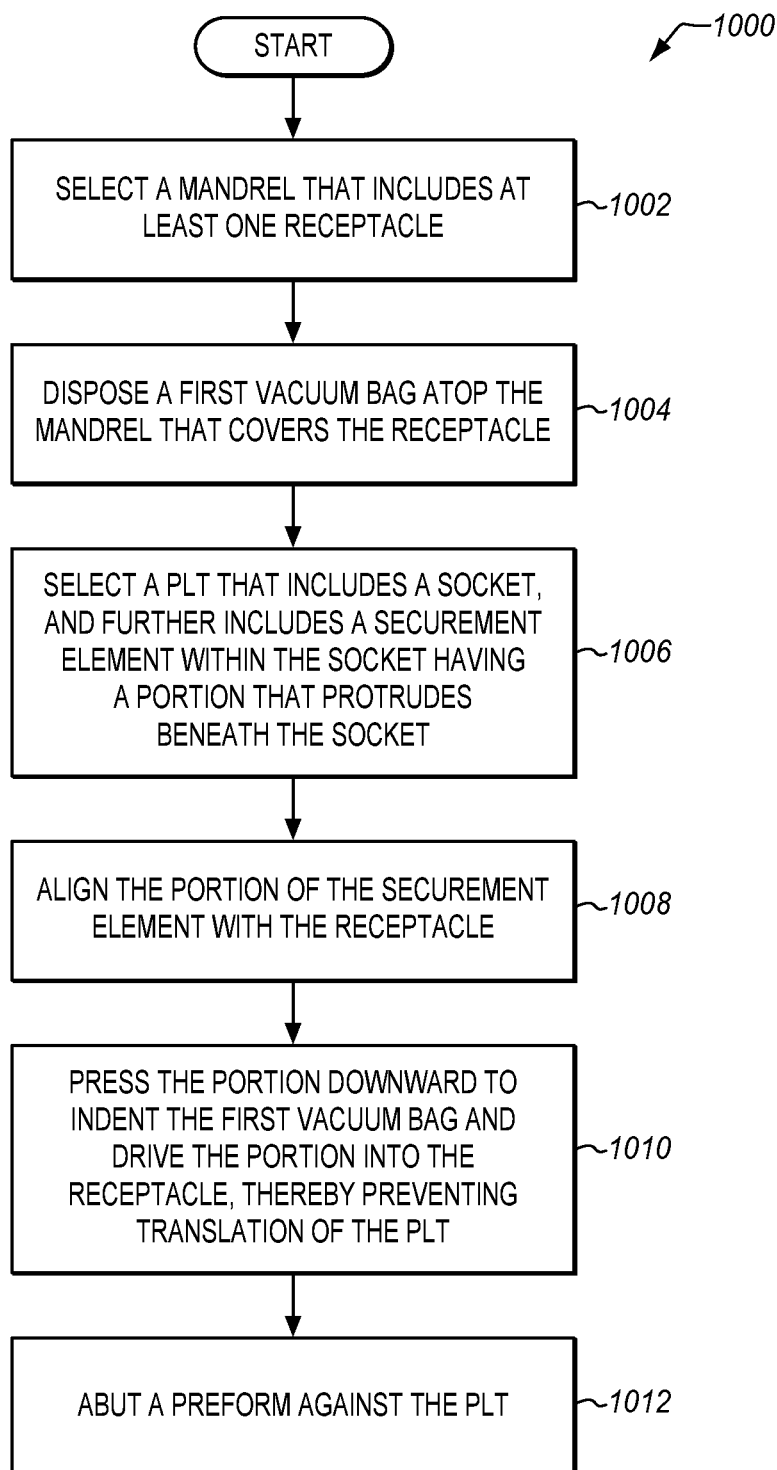
FIG. 10 is a flowchart illustrating a method of securing a PLT to a mandrel in an illustrative embodiment.

FIG. 10 is a flowchart illustrating a method 1000 for fabricating a composite part in an illustrative embodiment. The steps of method 1000 are described with reference to composite fabrication system 100 of FIG. 1, but those skilled in the art will appreciate that method 1000 may be performed in other systems. The steps of the flowcharts described herein are not all inclusive and may include other steps not shown. The steps described herein may also be performed in an alternative order.

In step 1002, a technician selects mandrel 110, which includes a receptacle 752. A first vacuum bag 120 is disposed atop the mandrel 110 (e.g., by the technician, or a robot) and covers the receptacle 752 (step 1004). A PLT 122 is selected in step 1006. The PLT 122 includes a socket 724, as well as a securement element 716 within the socket 724. The securement element 716 has a portion 910 that protrudes beneath the socket. The portion 910 of the securement element 716 is aligned with the receptacle 752 (e.g., by rolling securement element 716 within socket 724 as PLT 122 traverses the surface 112 of mandrel 110) (step 1008). The method further includes pressing portion 910 downward to indent the first vacuum bag 120 and drive the portion 910 into the receptacle 752 (step 1010). This step may be performed manually, or may be performed by placing a magnet at PLT 122 which magnetically forces PLT 122 towards surface 112 of mandrel 110. With portion 910 pressed into receptacle 752, physical interference prevents translation of the PLT 122.

A preform 200 may be laid-up atop first vacuum bag 120, and features 220 of the preform 200 may contact the borders 140 of PLT 122 (and any other PLTs that have been secured). That is, preform 200 may be abutted against PLT 122 (step 1012), in response to identifying a tool (e.g. PLT 122) that is at the mandrel for which translation has been prevented (e.g., that has been secured to the mandrel). A second vacuum bag 300 may then be placed atop the preform 200 and the PLT 122, and the vacuum may draw flanges 210 of preform 200 into hollow portions 114 of mandrel 110. Heat and/or pressure may then be applied to cure the preform 200 into a composite part.

Method 1000 provides a benefit over prior techniques because it enables preforms to be secured relative to a mandrel, even when the preforms are laid-up atop a vacuum bag which may be slippery or slick. Hence, motion and/or distortion of preforms during the curing process is prevented, which increases the efficacy of double-diaphragm curing processes.

EXAMPLES

In the following examples, additional processes, systems, and methods are described in the context of a double diaphragm vacuum bagging system and composite fabrication process.

Figure 11:
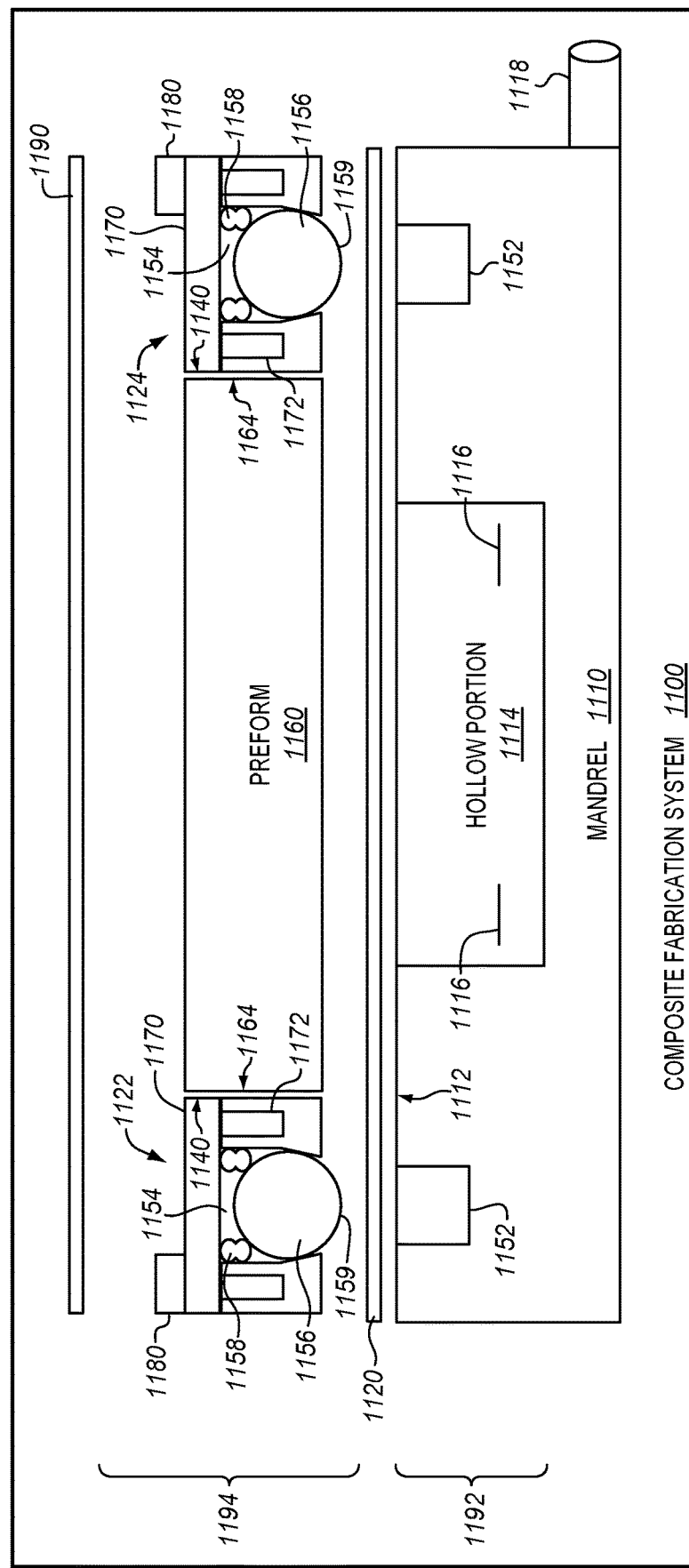
FIG. 11 is a block diagram of a composite fabrication system in an illustrative embodiment.

FIG. 11 is a block diagram of a composite fabrication system 1100 in an illustrative embodiment. Composite fabrication system 1100 includes mandrel 1110 having surface 1112 and hollow portion 1114. Hollow portion 1114 includes slits 1116. Air evacuates from hollow portion 1114 via slits 1116 and out via vacuum cable 1118. Mandrel 1110 also includes receptacles 1152. First vacuum bag 1120 is laid-up atop surface 1112, and PLTs 1122 and 1124 are placed atop the first vacuum bag 1120. Specifically, a securement element 1156 within a socket 1154 of each PLT is aligned with a receptacle 1152. Biasing devices 1158 push securement elements 1156 downward, and a portion 1159 of securement elements 1156 protrudes downward out of socket 1154. Magnets 1180 provide force that drives the PLTs into the receptacles 1152. Furthermore, each securement element 1156 is held within socket 1154 by a combination of fasteners 1172 and cap 1170.

Preform 1160 includes features 1164 which contact borders 1140 of PLT 1122 and PLT 1124. Second vacuum bag 1190 is placed atop the PLTs and the preform, in order to form a double-diaphragm seal in which to cure preform 1160. Specifically, a first diaphragm 1192 is formed between first vacuum bag 1120 and mandrel 1110, and a second diaphragm 1194 is formed between second vacuum bag 1190 and first vacuum bag 1120.

Figure 12:
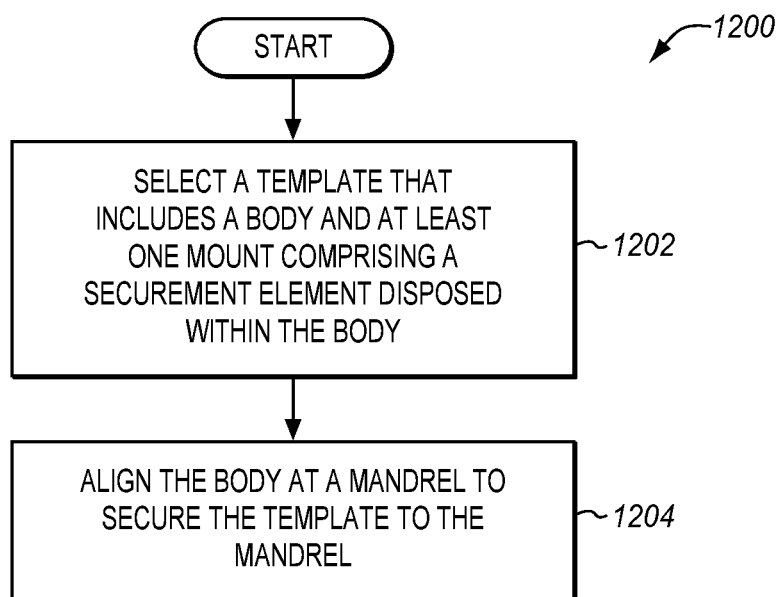
FIG. 12 is a flowchart illustrating a method of operating a PLT in an illustrative embodiment.

FIG. 12 is a flowchart illustrating a method 1200 of operating a PLT in an illustrative embodiment. According to method 1200, step 1202 includes selecting a PLT that includes a body and at least one mount comprising a socket and a securement element disposed within the socket. Step 1204 includes aligning the socket at a mandrel to secure the PLT to the mandrel.

Figure 13:
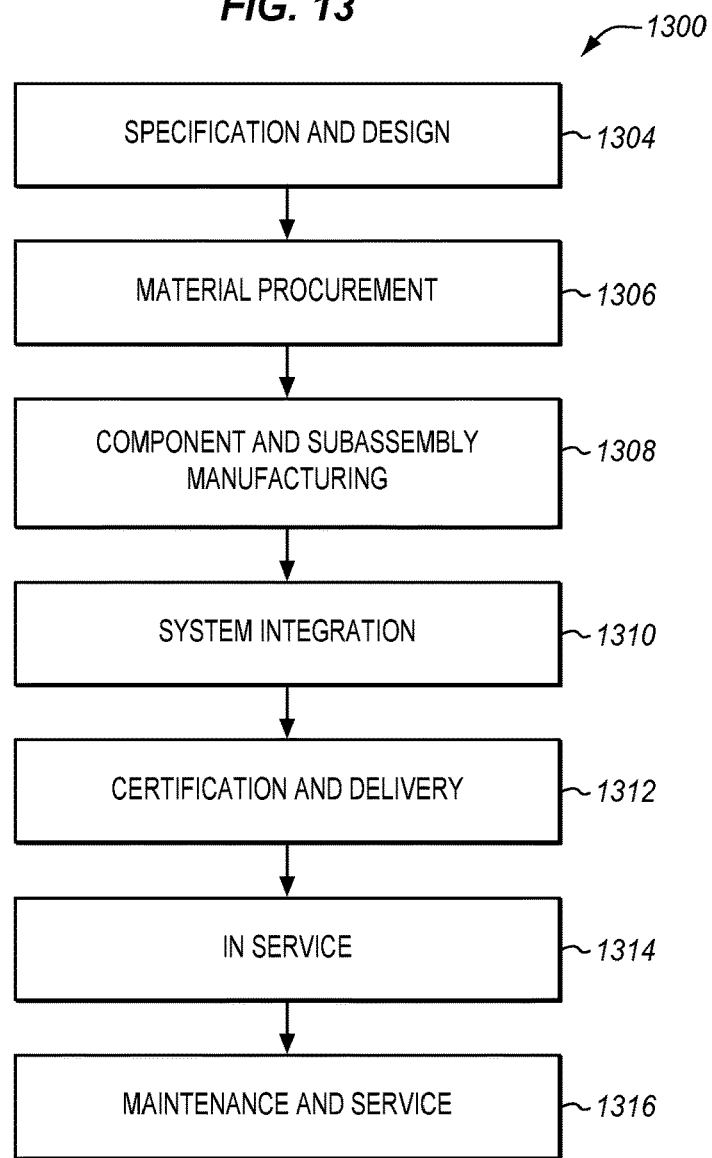
FIG. 13 is a flow diagram of aircraft production and service methodology in an illustrative embodiment.
Figure 14:
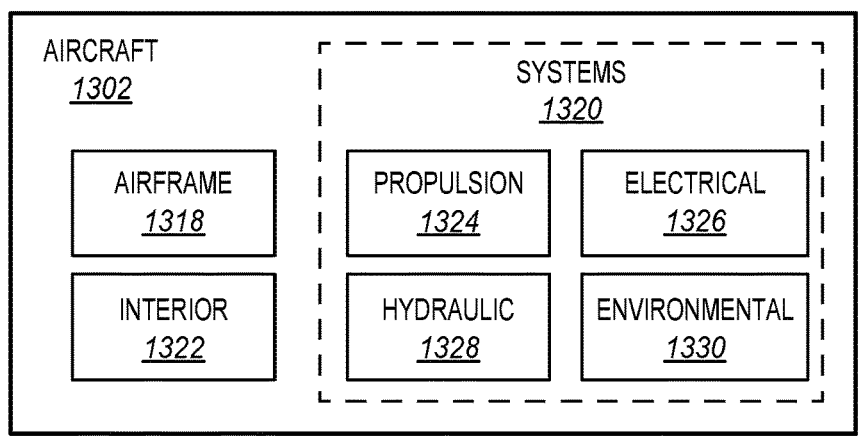
FIG. 14 is a block diagram of an aircraft in an illustrative embodiment.

Referring more particularly to the drawings, embodiments of the disclosure may be described in the context of aircraft manufacturing and service in method 1300 as shown in FIG. 13 and an aircraft 1302 as shown in FIG. 14. During pre-production, method 1300 may include specification and design 1304 of the aircraft 1302 and material procurement 1306. During production, component and subassembly manufacturing 1308 and system integration 1310 of the aircraft 1302 takes place. Thereafter, the aircraft 1302 may go through certification and delivery 1312 in order to be placed in service 1314. While in service by a customer, the aircraft 1302 is scheduled for routine work in maintenance and service 1316 (which may also include modification, reconfiguration, refurbishment, and so on). Apparatus and methods embodied herein may be employed during any one or more suitable stages of the production and service described in method 1300 (e.g., specification and design 1304, material procurement 1306, component and subassembly manufacturing 1308, system integration 1310, certification and delivery 1312, service 1314, maintenance and service 1316) and/or any suitable component of aircraft 1302 (e.g., airframe 1318, systems 1320, interior 1322, propulsion system 1324, electrical system 1326, hydraulic system 1328, environmental 1330).

Each of the processes of method 1300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 14, the aircraft 1302 produced by method 1300 may include an airframe 1318 with a plurality of systems 1320 and an interior 1322. Examples of systems 1320 include one or more of a propulsion system 1324, an electrical system 1326, a hydraulic system 1328, and an environmental system 1330. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1300. For example, components or subassemblies corresponding to component and subassembly manufacturing 1308 may be fabricated or manufactured in a manner similar to components or subassemblies produced while the aircraft 1302 is in service. Also, one or more apparatus embodiments, method embodiments, or a combination thereof may be utilized during the subassembly manufacturing 1308 and system integration 1310, for example, by substantially expediting assembly of or reducing the cost of an aircraft 1302. Similarly, one or more of apparatus embodiments, method embodiments, or a combination thereof may be utilized while the aircraft 1302 is in service, for example and without limitation during the maintenance and service 1316. For example, the techniques and systems described herein may be used for material procurement 1306, component and subassembly manufacturing 1308, system integration 1310, service 1314, and/or maintenance and service 1316, and/or may be used for airframe 1318 and/or interior 1322. These techniques and systems may even be utilized for systems 1320, including, for example, propulsion system 1324, electrical system 1326, hydraulic 1328, and/or environmental system 1330.

In one embodiment, a part comprises a portion of airframe 1318, and is manufactured during component and subassembly manufacturing 1308. The part may then be assembled into an aircraft in system integration 1310, and then be utilized in service 1314 until wear renders the part unusable. Then, in maintenance and service 1316, the part may be discarded and replaced with a newly manufactured part. Inventive components and methods may be utilized throughout component and subassembly manufacturing 1308 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for facilitating layup of preforms, comprising:
   selecting a mandrel that includes at least one receptacle;
   disposing a first vacuum bag atop the mandrel that covers the receptacle;
   selecting a Ply Location Template (PLT) that includes a securement element;
   aligning a portion of the securement element with the receptacle;
   pressing the portion of the securement element downward into the first vacuum bag and driving the portion of the securement element into the receptacle; and
   abutting a preform against the PLT.

2. The method of claim 1 wherein:
   the PLT includes a socket, the securement element is within the socket, and the securement element has a portion that protrudes beneath the socket, wherein:
   pressing the portion of the securement element comprises indenting the vacuum bag with the portion of the securement element, and
   driving the securement element into the receptacle prevents translation of the PLT.

3. The method of claim 1 further comprising:
   laying up the preform by disposing edges of the preform against the PLT.

4. The method of claim 3 further comprising:
   disposing a second vacuum bag atop the preform;
   drawing a vacuum between the first vacuum bag and the second vacuum bag; and
   curing the preform into a composite part.

5. The method of claim 1 further comprising:
   securing the securement element into the receptacle by placing a cap atop a socket of the PLT.

6. The method of claim 1 further comprising:
   evacuating air between the first vacuum bag and the mandrel.

7. The method of claim 1 wherein:
   the securement element comprises a sphere; and
   aligning the portion of the securement element with the receptacle comprises rolling the sphere within a socket of the PLT.

8. The method of claim 7 wherein:
   the portion of the securement element protrudes from the socket and has a diameter less than or equal to a diameter of the receptacle.

9. The method of claim 1 further comprising:
   placing a biasing component within a socket of the PLT that applies force which pushes the portion of the securement element out of the socket.

10. The method of claim 1 wherein:
    the mandrel includes at least two receptacles, the PLT includes at least two sockets that each include a securement element, and the method further comprises:
    aligning portions of the securement elements with the receptacles; and pressing the portions of the securement elements downward to indent the vacuum bag and drive the portions into the receptacles, thereby preventing translation and rotation of the PLT.

11. The method of claim 1 further comprising:
magnetically driving the securement element into the receptacle.

12. The method of claim 1 further comprising:
placing a magnet atop the PLT.

13. The method of claim 1 wherein:
the mandrel includes hollow portions, and the method further comprises connecting the hollow portions with a vacuum cable.

14. The method of claim 1 further comprising:
protruding flanges of the preform out over hollow portions at the mandrel.

15. The method of claim 1 further comprising:
magnetically driving the PLT into the mandrel.

16. The method of claim 1 further comprising:
placing biasing devices within recesses defined by caps atop the PLT.

17. The method of claim 16 further comprising:
applying force via the biasing devices that push the securement element downwards.

18. The method of claim 1 further comprising:
conforming a body of the PLT with a surface of the mandrel.

19. The method of claim 1 wherein:
abutting the preform against the PLT comprises abutting prepreg carbon fiber against the PLT.

20. The method of claim 1 wherein
abutting the preform against the PLT comprises abutting dry fiber against the PLT.

* * * * *